United States Patent [19]

Hillman

[11] 4,445,587
[45] May 1, 1984

[54] MOTORCYCLE COOLING SYSTEM

[75] Inventor: Michael J. Hillman, Fox Point, Wis.

[73] Assignee: Harley-Davidson Motor Co., Inc., Milwaukee, Wis.

[21] Appl. No.: 331,132

[22] Filed: Dec. 16, 1981

[51] Int. Cl.³ .................. B62D 61/02; B60K 11/04
[52] U.S. Cl. .................... 180/229; 165/51; 165/44; 123/41.01; 123/41.48
[58] Field of Search .......... 165/122, 51; 180/219, 180/225; 123/41.48, 41.33

[56] References Cited

U.S. PATENT DOCUMENTS

| 4,019,595 | 4/1977 | Imai et al. | 180/229 |
| 4,354,570 | 10/1982 | Tanaka | 180/219 |
| 4,396,086 | 8/1983 | Hattori | 180/229 |

FOREIGN PATENT DOCUMENTS 1192537  5/1964  Fed. Rep. of Germany ........ 165/51

*Primary Examiner*—William R. Cline
*Assistant Examiner*—T. W. Streule
*Attorney, Agent, or Firm*—Fred Wiviott

[57] ABSTRACT

A cooling system for the internal combustion engine of a motorcycle includes a radiator and means defining air passages each having a forwardly facing inlet opening disposed respectively on the opposite sides of the motorcycle's front fork. Each air passage extends rearwardly from the inlet opening to an outlet which opens into a plenum chamber disposed adjacent the radiator. The cross-sectional area of each passage increases gradually between its inlet and outlet ends. An exhaust duct is connected to the plenum chamber and the radiator is disposed between the plenum chamber and the exhaust duct.

13 Claims, 4 Drawing Figures

MOTORCYCLE COOLING SYSTEM

BACKGROUND OF THE INVENTION

This invention relates to motorcyles and more particularly to a motorcyle cooling system.

In the prior art, motorcycle engines have been both air and water cooled. When water cooling is employed, sufficient ambient air must be passed through the radiator to satisfy the cooling requirements of the engine. This has created design problems in that the bow wave created by the front portions of the motorcyle such as the fork, the fairing, the fender, and the headlight, tend to divert the air stream outwardly of the radiator, particularly when the same is mounted forwardly of the engine. As a result, radiators mounted in this manner tended to be relatively inefficient requiring a comparatively larger physical size.

SUMMARY OF THE INVENTION

The primary object of the invention is to provide a cooling system for motorcycle engines.

A further object of the invention is to provide a cooling system for liquid cooled internal combustion motorcycle engines which delivers sufficient air to the radiator to satisfy engine cooling requirements.

Another object of the invention is to provide an air collection system for motorcycle internal combustion engine cooling systems which does not detract from the aesthetic appearance of the vehicle.

A still further object of the invention is to provide a cooling system for a liquid cooled motorcycle engine wherein heated air does not pass over the operator or a passenger.

Yet another object of the invention is to provide a cooling system for a liquid cooled motorcycle engine wherein improved radiator efficiency is achieved.

These and other objects and advantages of the present invention will become more apparent from the detailed description thereof taken with the accompanying drawings.

In general terms, the invention comprises a motorcyle including front and rear forks for mounting front and rear wheels, respectively, a frame interconnecting said forks, a liquid cooled internal combustion engine and a radiator for said engine supported on said frame and between said forks. The improvement comprises an air transport system for said radiator which includes means defining first and second air passages, each having an inlet disposed respectively on the opposite side of the forks. Each air passage extends rearwardly from its inlet and has an outlet opening into a plenum chamber disposed adjacent the radiator with the cross sectional area of each air passage increasing gradually from its inlet to its outlet ends. An exhaust duct is connected to the plenum chamber with the radiator disposed between the plenum and the exhaust duct.

DESCRIPTION OF THE PREFERRED EMBODIMENT

Figure 1:
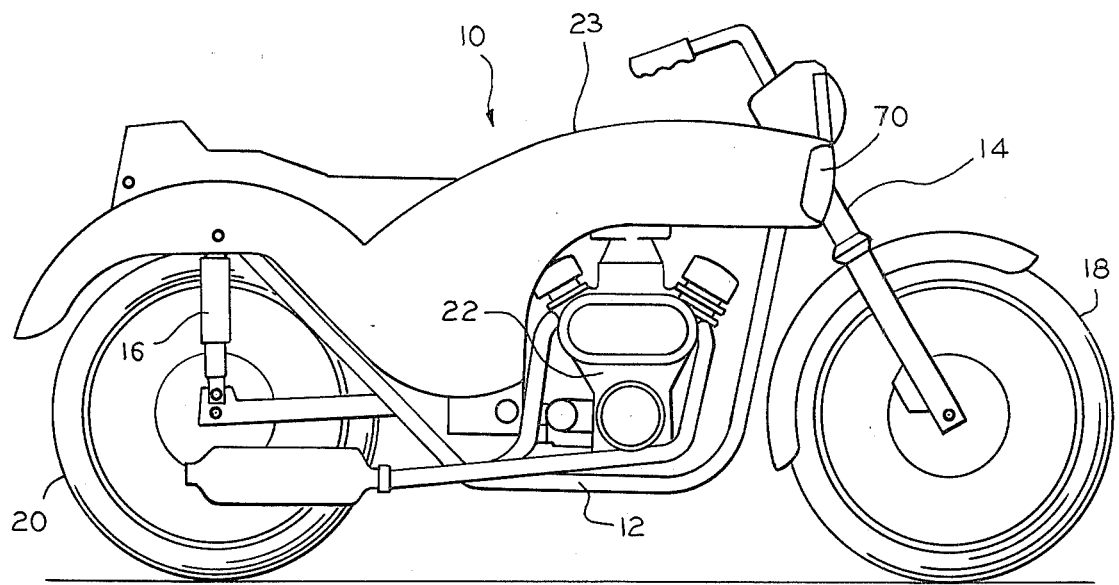
FIG. 1 is a side elevational view of a motorcycle incorporating the invention.

FIG. 1 shows a motorcycle 10 which incorporates the cooling system in accordance with the preferred embodiment of the invention and includes a frame 12 having a front fork 14 and a rear fork 16 to which front and rear wheels 18 and 20 are respectively mounted in a conventional manner. A watercooled, internal combustion engine 22 is mounted on frame 12 and is coupled to rear wheel 20 in a manner well known in the art to provide motive power for the motorcyle 10. A body 24 is mounted on the frame 12 above the engine 22 and encloses a gas tank and an air cleaner (not shown) in addition to the cooling system in accordance with the preferred embodiment of the invention.

Figure 2:
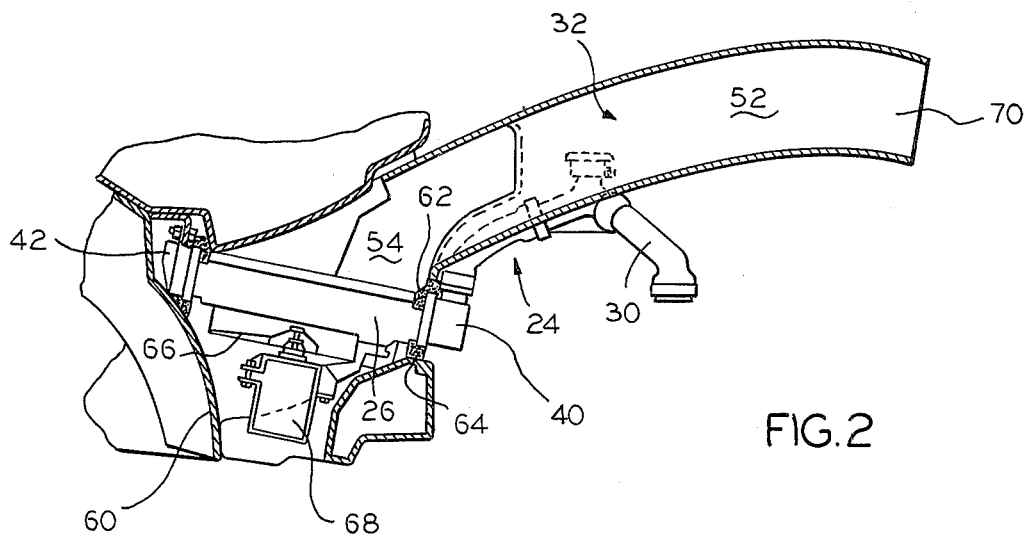
FIG. 2 is a side view, with parts broken away, of the cooling system according to the invention.
Figure 3:
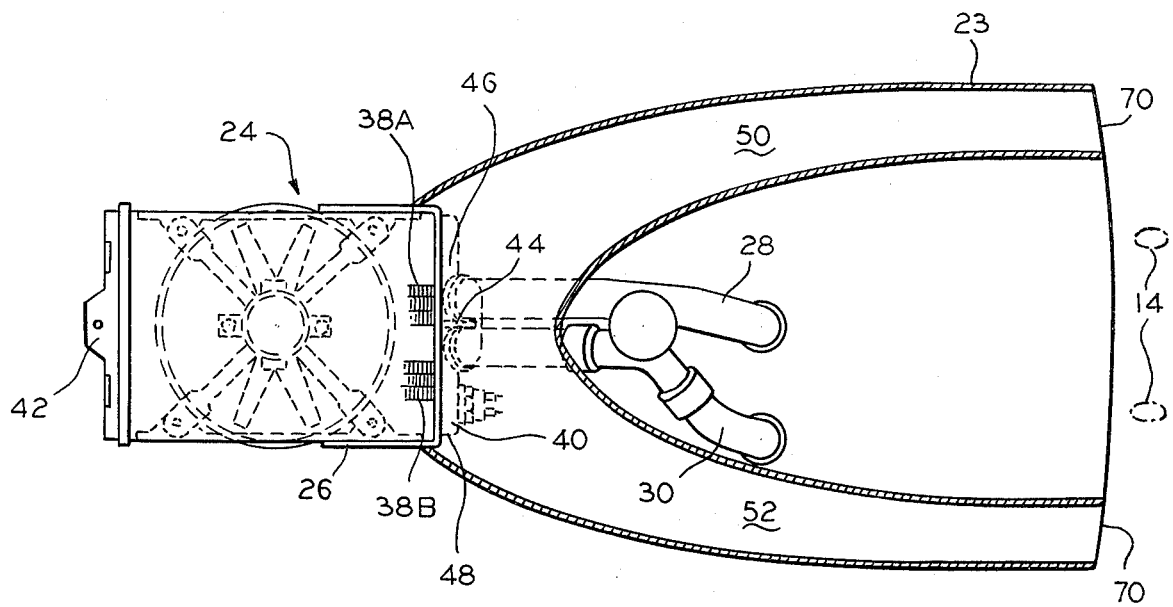
FIG. 3 is a plan view, with parts broken away of the cooling system shown in FIG. 2.

As seen more particularly in FIGS. 2 and 3, the cooling system 24 for the engine 22 includes a radiator 26, engine coolant outlet and return pipes 28 and 30 for coupling the radiator 26 to the engine 22 and an air flow system 32 for delivering ambient air to the radiator 26 for the exchange of heat with the engine cooling fluid therein.

The radiator 26 is generally rectangular in plan view and includes a plurality of finned tubes 38A and 38B extending between headers 40 and 42. The engine coolant outlet and return pipes 28 and 30 are connected to the header 40 on the opposite sides of a partition 44 which divides header 40 into an inlet chamber 46 which communicates with tubes 38A and a return chamber 48 which communicates with tubes 38B. As a result, engine coolant flows from the engine 22 through pipe 28 into chamber 46 for passage through tubes 38A to header 42, and then back through tubes 38B to chamber 48 for return flow to engine 22. It can be seen that by coupling the engine outlet and return pipes 28 and 30 to the side the radiator 26 nearest engine 22, these connections can be maintained without interference with the air flow in system 32.

The air flow system 32 is disposed within the body 23 and includes a pair of air passages 50 and 52 which are formed of sheet metal and extend from the front of the body 23 rearwardly where they merge into a plenum chamber 54. The radiator 26 lies below the plenum chamber 54 and is inclined from front to rear at a slight vertical angle. An exhaust duct 60 which is also formed of sheet metal communicates with the opposite side of the radiator 26 and extends generally downwardly therefrom. Those portions of the plenum 54 and the duct 60 adjacent the radiator 26 are configured similarly to the generally rectangular upper and lower margins thereof and are sealed thereto by seals 62 and 64 so as to form a continuous passage intersected by the radiator 26. A fan 66 is disposed within exhaust duct 60 adjacent the radiator 26 and is driven by a motor 68 to assist in the cooling air flow. The downwardly oriented exhaust duct 60 insures that heated air from radiator 26 will not flow over the operator or a passenger.

Figure 4:
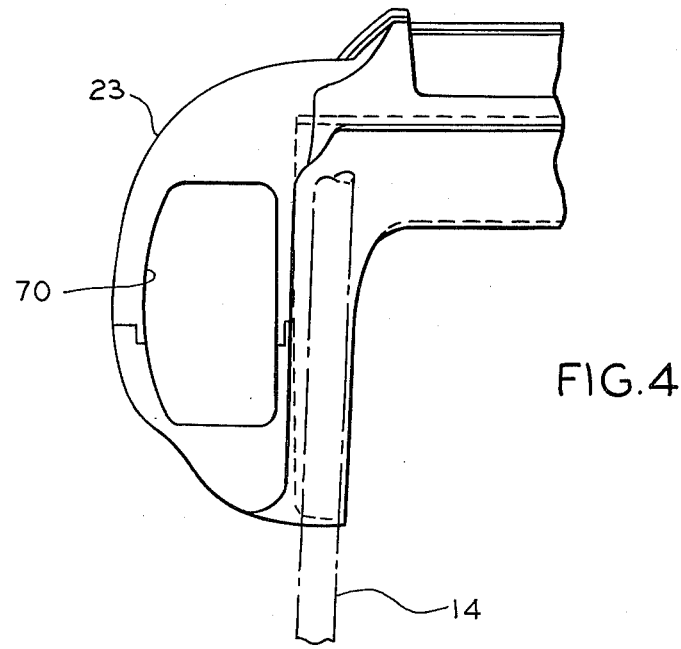
FIG. 4 is a front view of one portion of the cooling system shown in FIGS. 2 and 3.

The passages 50 and 52 are identically formed with one being the mirror image of the other and both curve rearwardly and downwardly in the side view shown in FIG. 2 and rearwardly and inwardly in plan view as shown in FIG. 3. At the front of each duct 50 and 52 is an inlet opening 70 disposed outwardly of the front fork 14. The inlet openings 70 are preferably generally rectangular as shown in FIG. 4 with a height to width ratio of about 2 to 1 which is similar to at least the initial portions of passages 50 and 52. From the inlet opening 60 there is a gradual increase in the height and width of each duct 50 and 52 until their merger at plenum 54. This gradual increase in cross sectional area of air passages 50 and 52 is such that the combined areas of the inlet openings 70 are at about one-fourth of the cross-sectional area of the radiator 26. It can also be seen that the rate of increase in area is greater in those portions of the passages 50 and 52 which are adjacent their outlet ends. The inlet openings are also positioned such that they are outside the bow wave formed in the air stream by the front fork 14. Additionally, the radiator 26 is chosen so as to have a substantial air flow resistance whereby back pressure in the air passages 50 and 52 minimizes turbulence therein. In practice, it has been found that the pressure drop should be about 25–80% and preferably about 50%. The air flow system 32 improves radiator efficiency thus permitting a smaller radiator to be employed than is the case with motorcycles having a radiator mounted forward of the engine.

While only a single embodiment of the invention has been illustrated and described, it is not intended to be limited thereby but only by the scope of the appended claims.

I claim:

1. A motorcycle including front and rear forks for mounting front and rear wheels respectively, a frame interconnecting said forks, a liquid cooled internal combustion engine and a radiator for said engine supporting on said frame and between said forks, the improvement comprising an air transport system for said radiator including:
   means defining first and second air passages each having a forwardly facing inlet opening disposed respectively on the opposite sides of said front fork,
   each air passage means extending rearwardly from its inlet,
   means defining a plenum chamber disposed adjacent said radiator,
   said air passages having an outlet opening into said plenum chamber,
   the cross sectional area of each passage increasing gradually between its inlet and outlet ends,
   an exhaust duct connected to said plenum chamber,
   said radiator being disposed between said plenum chamber and said exhaust duct and creating a substantial resistance to air flow therebetween.

2. Cooling system set forth in claim 1 wherein each of said air passages curves inwardy and downwardly as it progresses from said inlet openings to said plenum chamber.

3. The motorcycle set forth in claim 2 wherein the cross sectional area of said radiator facing said plenum chamber is about four times the combined areas of said inlets.

4. The cooling system set forth in claims 1, 2 or 3 wherein said exhaust duct extends downwardly, said radiator being oriented in a slight inclined angle from front to rear and being disposed between said plenum chamber and said exhaust duct.

5. The cooling system set forth in claim 4 wherein said air passages each have a first portion adjacent its inlet end and a second portion adjacent its outlet end; the rate of increase in a cross sectional area per incremental length of said air passages is substantially greater in the second portion than in the first portion.

6. The cooling system set forth in claim 5 wherein each of said inlets is generally rectangular and has a height of about twice its width.

7. The cooling system set forth in claim 6 wherein said radiator includes a plurality of heat exchange tubes disposed in general parallelism and a header disposed at each of the opposite ends of said tubes, a divider in the first header dividing the same into first and second chambers, a cooling water inlet pipe connected to one of said chambers and a water outlet pipe connected to the other chamber, said pipes extending forwardly of said radiator and being connected to said engine.

8. A cooling system for a liquid cooled motorcycle engine including a radiator for dissipating heat from the engine cooling liquid,
   first and second conduit means each defining air passages and having an inlet opening spaced one from the other and from said radiator,
   means defining a plenum chamber disposed adjacent said radiator,
   said conduit means each extending from its inlet opening to said plenum chamber and having an outlet opening into said plenum chamber,
   the cross sectional area of each passage increasing gradually between its inlet and outlet ends,
   an exhaust duct connected to said plenum chamber and extending downwardly therefrom,
   said radiator being disposed between said plenum chamber and said exhaust duct and creating a substantial resistance to air flow therebetween.

9. The cooling system set forth in claim 8 wherein said radiator is inclined upwardly at a slight angle relative to the plenum chamber, and means sealing the periphery of said radiator relative to said plenum chamber and exhaust duct.

10. The cooling system set forth in claim 9 wherein the area of said radiator facing said plenum chamber is about four times the combined areas of said inlet openings.

11. The cooling system set forth in claims 8, 9 or 10 wherein the pressure drop across said radiator is about 25–80%.

12. The cooling system set forth in claim 11 and including a fan disposed in said exhaust duct and adjacent said radiator.

13. The cooling system set forth in claims 8, 9 or 10 wherein the pressure drop across said radiator is about 50%.

* * * * *